[11] 3,626,321

[72] Inventor Archibald W. Smith
Briarcliff Manor, N.Y.
[21] Appl. No. 775,363
[22] Filed Nov. 13, 1968
[45] Patented Dec. 7, 1971
[73] Assignee International Business Machines Corporation
Armonk, N.Y.

[54] OPTICAL SCANNER AND METHOD FOR OPTICAL SCANNING
14 Claims, 8 Drawing Figs.

[52] U.S. Cl................................................. 331/94.5,
350/161, 350/163
[51] Int. Cl.................................................... H01s 3/10
[50] Field of Search........................................... 331/94.5;
350/161, 163; 178/7.6; 332/7.51

[56] References Cited
UNITED STATES PATENTS
3,493,288 2/1970 Kaufman et al............... 350/163
3,408,656 10/1968 Lamberts..................... 331/94.5 X
3,331,651 7/1967 Sterzer........................ 350/96

*Primary Examiner*—Ronald L. Wibert
*Assistant Examiner*—Edward S. Bauer
*Attorneys*—Hanifin and Clark and Bernard N. Wiener

ABSTRACT: There is disclosed an optical scanner for optically scanning a target trace in the focal plane of an optical lens system. By establishing a plurality of coherent light beams with ordered geometrical intervals and frequency differentials from each other, the appropriate phase relationships are established for the beams to provide a moving interference pattern on the target trace. In particular, the source of the coherent beams alternatively may be a single beam laser whose consequent beam is caused by multiple reflections, diffractions, and transmissions to become an effective plurality of coherent beams or may be a multimode laser cavity whose beams are phase locked by the diffraction property of an acoustic wave medium. In particular, the diffraction of an incoming light beam by an acoustic wave obtains the requisite phase locking for the several interfering beams on the target trace.

INVENTOR
ARCHIBALD W. SMITH

BY Bernard N. Wiener
ATTORNEY

OPTICAL SCANNER AND METHOD FOR OPTICAL SCANNING

BACKGROUND OF THE INVENTION

This invention relates generally to optical scanners and it relates more particularly to an optical scanner of the laser beam nature in which an interference pattern is formed at a location by a plurality of coherent light beams with appropriate phase relationships.

It is becoming increasingly important in the field of data processing to have available a scanning light beam for a target trace. Of the many uses of a scanning light beam in the field of data processing, two uses are of special interest: (1) the quantity of the light absorbed or transmitted provides a measure of the data either written into or retrieved from the target plane; (2) the scanning light beam sensitizes local regions in the target plane for storage or recovery of information in accordance with the nature of a particular local region. Among the prior art technologies applied for purpose of optically scanning a target trace are the mechanical location of a prism or mirror to which a stationary optical beam is incident, and a laser device whose direction of lasing is controlled by special tuning of the laser cavity. These prior technologies are of either mechanical or electrical nature such that the inherent limitation of switching speed of a mechanism or a circuit limits the speed with which the target trace can be scanned.

OBJECTS OF THE INVENTION

It is an object of this invention to provide apparatus and method for scanning a trace location with an optical beam.

It is another object of this invention to provide apparatus and method for optically scanning a linear trace.

It is another object of this invention to provide apparatus and method for optically scanning a linear trace by forming a moving interference beam thereon.

It is another object of this invention to provide apparatus and method for optically scanning a one dimensional linear trace in the focal plane of an optical lens by establishing a plurality of coherent beams at ordered geometrical intervals relative to the lens and having an ordered frequency differential relationship with each other.

It is another object of this invention to provide apparatus and method for establishing a moving light spot on a topological trace via a plurality of coherent light beams ordered geometrically in space and having an inherent frequency differential relationship with each other respectively.

It is another object of this invention to provide apparatus and method for establishing a transitory interference pattern along a topological trace by dispersing a coherent beam along a plurality of paths with an ordered geometrical interval and frequency differential relationship therebetween.

It is another object of this invention to provide apparatus and method for mode locking the transverse modes of a multimode laser cavity.

It is another object of this invention to provide apparatus and method for locking the transverse modes of a multimode laser cavity by diffraction of optical energy by an acoustic wave.

SUMMARY OF THE INVENTION

This invention provides an optical scanner for a target trace through a moving interference pattern resultant from a plurality of coherent optical beams. Each optical beam is displaced in a regular manner in both space and frequency from each other. There is automatically a comparable phase displacement relationship resultant from the established frequency relationship.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIGS. 1A, 1B, 1C and 1D relate to prior art principles and practice of which:

FIG. 1A illustrates a plurality of coherent optical beams each with a different phase which are collimated by a lens to provide a stationary interference spot at the focal plane of the lens;

FIG. 1B is a schematic diagram of a laser cavity with a single transverse mode and a plurality of longitudinal modes illustrating the phase locking of the output frequency pattern;

FIG. 1C is a graphical presentation of the spread of frequencies of a laser mode and the frequency dependence of the laser gain;

FIG. 1D shows the sidebands which achieve mode locking for each frequency;

PRINCIPLE AND PRACTICE OF THE INVENTION

Figure 1A:
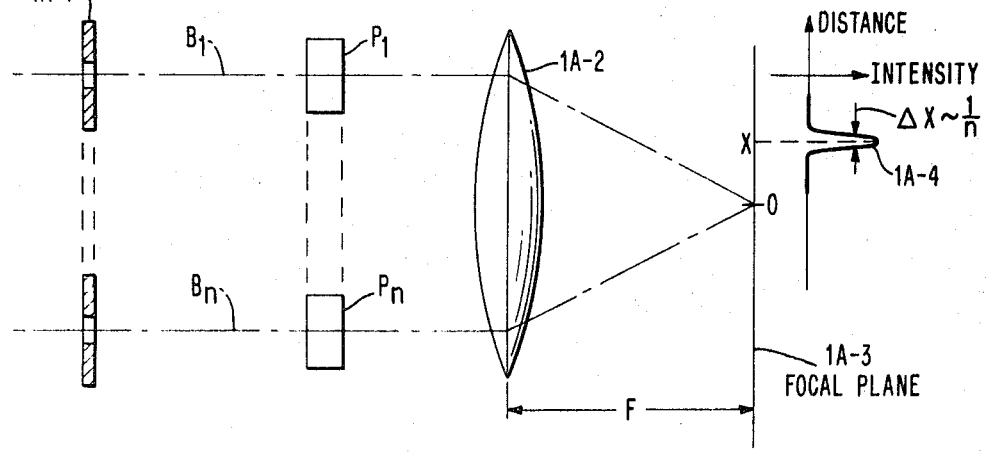

The nature of an interference pattern of the prior art from a plurality of coherent optical beams stationary in both space and time will now be described with reference to FIG. 1A. A number of coherent beams $B_1,.....B_n$ whose origin is a common beam, not shown, are established via aperture plate 1A–1. A phase shifter $P_1......P_n$ for each respective optical beam $B_1,.....B_n$ provides a fixed phase increment between adjacent beams of $\Delta\Phi$. A collimating lens 1A–2 causes the several optical beams $B_1,....B_n$ to focus on the target or focal plane 1A–3 at focal distance F. The amplitude of the intensity of the resultant light beam at the target plane is indicated by the curve 1A–4. The position X of the intensity maximum is determined by $\Delta\Phi$. The spread in distance on the target plane $\Delta x$ measured at 0.81 of the peak value (the Rayleigh criterion) is related to the inverse of the number of the beams forming the interference pattern. A background reference concerning a linear optical scan is an article by A. Korpel, Proceedings of IEEE, pp. 1666, Oct. 1965.

Figure 1B:
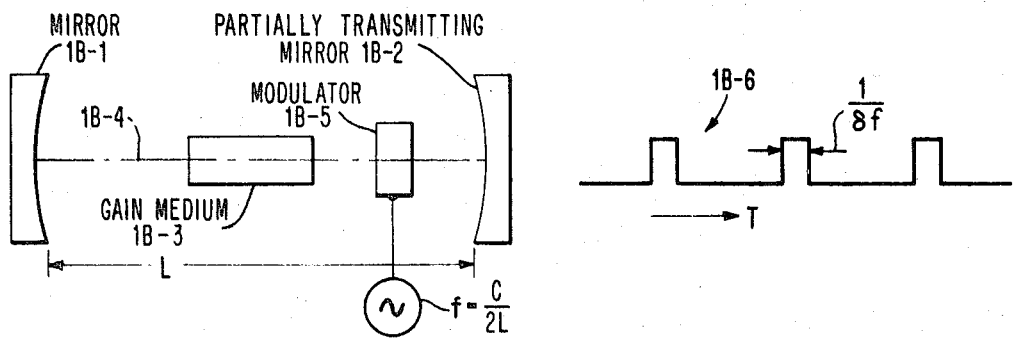
Figure 1C:
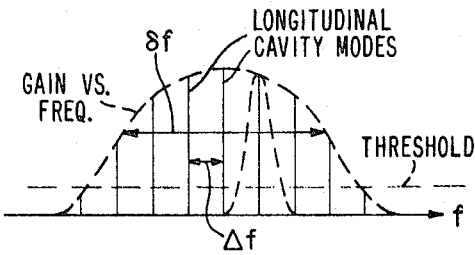
Figure 1D:
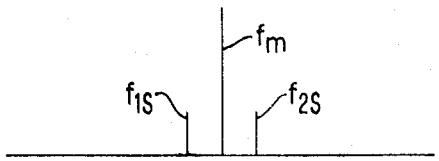

The nature of phase locking or mode locking of lasers of the prior art will now be described with reference to FIG. 1B. In FIG. 1B the completely reflecting mirror 1B–1 laser cavity termination is shown at the left of the drawing and the partially transmitting mirror 1B–2 is shown at the right. A gain medium 1B–3 for the laser is established in the beam 1B–4 between the mirrors. The gain medium 1B–3 actually includes the source of the coherent optical energy and a pumping means therefor. The distance between the extremities of the laser cavity is L. The possible frequencies for lasing of the laser cavity in FIG. 1B is according to the distribution shown in FIG. 1C in which the envelope of the gain versus frequency is plotted against a frequency scale. The gain envelope has width $\delta f$ measured at half maximum gain intensity. There is a distribution of longitudinal cavity modes with frequency separation $\Delta f = c/2L$. The threshold for lasing occurs when the gain equals the cavity losses; only modes whose gain exceeds threshold will lase. A modulator 1B-5 with a frequency equal to $c/2L$, which is equal to 1/(transit time), is imposed on the laser beam of FIG. 1B. As a consequence of the modulator 1B-5, for each mode of the spread of frequencies of FIG. 1C there is a main frequency FM and a side frequency $f_{1s}$ and $f_{2s}$ on either side of the main frequency as shown in FIG. 1D. The consequence of the side frequencies is to cause the cavity modes to lock into a modal phase relationship determined by the side band frequencies. The resultant output from the laser cavity of FIG. 1B is the wave pattern of FIG. 1C where each successive pulse of optical energy emerges from the partially transmitting mirror with a pulse width of approximately $1/\delta f$ and the time between successive pulses being given by the transit time $T=2L/c$. A background reference on longitudinal mode locking of a laser is an article by M. DiDomenica, et al. *Applied Physics Letter*, 8, 180 (1966).

The practice of this invention will be described in general with reference to FIG. 2 which is a schematic diagram of an embodiment indicating the relationship of a plurality of light beams therein. There is a resultant interference pattern 18 on the target 20 from a plurality of light beam sources 10-1 to 10-$n$ which produce a plurality of coherent light beams 12-1 to 12-$n$ via apertures 11-1 to 11-$n$, respectively. Optical lens 14 bends the light beams 12-1 to 12-$n$ to the focal point thereof at a distance F from the lens. The frequencies of the light beams 12-1 to 12-$n$ are $\omega_0, \omega_0+\Delta\omega, \ldots \omega_0+(n-1)\Delta\omega$. The interference pattern 18 on the target trace 20 is shown as consisting illustratively of the lobes L-1,..... L-4, which are the four strongest lobes. The interference pattern 18 moves at a constant rate along the trace 20. By appropriately spacing the interference lobes L-1 to L-4, a given target trace 20 is transversed by the main lobe L-2 or L-3 of the regular interference pattern.

OTHER EMBODIMENTS OF THE INVENTION

Figure 2:
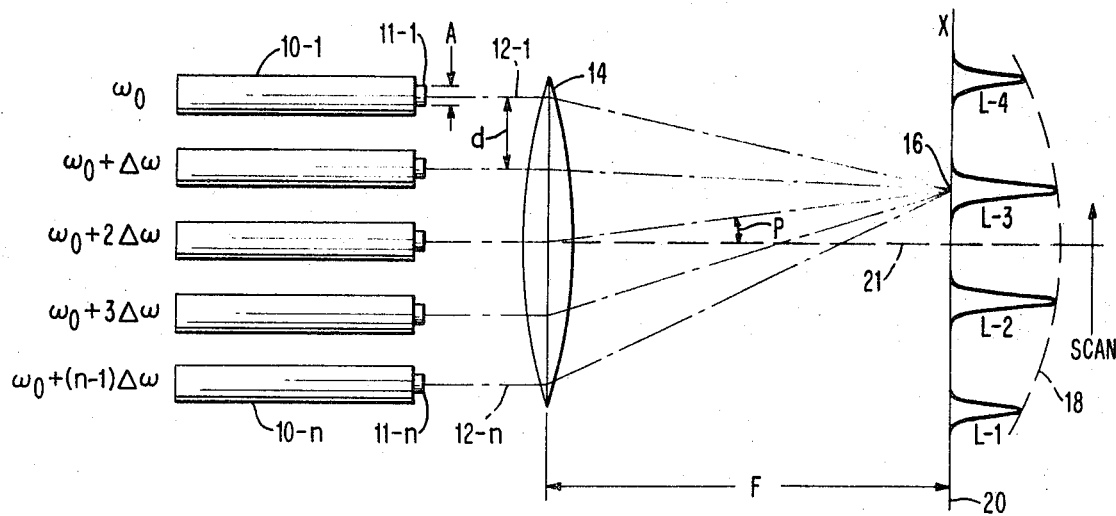
FIG. 2 is a schematic diagram of an embodiment of this invention illustrating the principle thereof that a plurality of coherent optical beams with particular frequency differentials therebetween results in a moving interference spot on the focal plane of a collimating lens.
Figure 3:
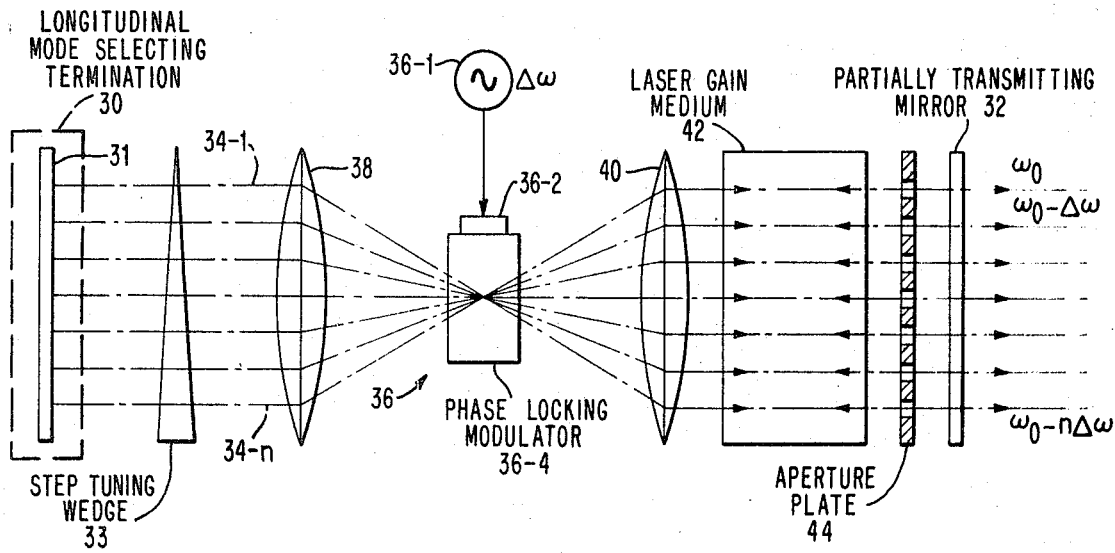
FIG. 3 is a schematic diagram of another embodiment of this invention illustrating the derivation of a plurality of laser beams by a phase locking modulator established within the laser cavity.

Another embodiment of this invention is presented in FIG. 3 which utilizes a laser cavity having multimode operation. The laser cavity comprises a totally reflecting, longitudinal-mode selecting termination 30 and a partially transmitting mirror surface 32. A step tuning wedge 33 to offset the frequency of the wave coherent beams 34-1,......34-$n$ is established in the laser cavity. A phase locking modulator 36 is located between the lenses 38 and 40. A laser gain medium 42 and aperture plate 44 are established between lens 40 and partially transmitting mirror 32 to complete the structure of the embodiment of FIG. 3. The gain medium 42 includes the source of coherent optical energy and the pumping means therefor. In greater detail, the phase locking modulator of 36 of FIG. 3 consists of a frequency source 36-1, transducer 36-2, and Debye-Sears acoustic wave diffractor 36-4. In greater detail, the phase locking modulator 36 accomplishes the phase locking by diffracting part of the incoming beam by the angle between adjacent outgoing beams, and by shifting the frequency of the diffracted beam by the frequency difference of adjacent beams. This extends the phase locking principle illustrated by FIGS. 1B, 1C, and 1D to beams traveling in different directions, and accomplishes the appropriate transverse mode locking of the plurality of output beams 34-,......34-$n$. Such a mode locked plurality of optical beams has the coherence necessary to obtain scanning of a target trace as described hereinbefore with reference to FIG. 2.

In order to achieve the desired scanning, it is desirable that each of the beams 34-1 to 34-N contain only one longitudinal mode. As noted in the discussion hereinbefore with reference to FIG. 1C, the longitudinal modes have spacing of $\Delta f=c/2L$ and usually a number of these fall under the gain envelope for the laser. The prior art presents several techniques for suppressing laser action on all but one longitudinal mode of a laser cavity. Illustratively, D. G. Carlson et al. present a polarization mode selector in IEEE J. of Quantum Electronics Vol. QE-4, p. 93, 1968; and P. W. Smith presents a multiple mirror mode selector in IEEE J. of Quantum Electronics Vol. QE-1, p. 343, 1965. These prior techniques may be used for the mode selecting termination 30 of the laser cavity of FIG. 3 to obtain single longitudinal mode operation for each of the beams 34-1 to 34-$n$. Such termination includes illustratively a totally reflecting mirror 31.

Figure 4:
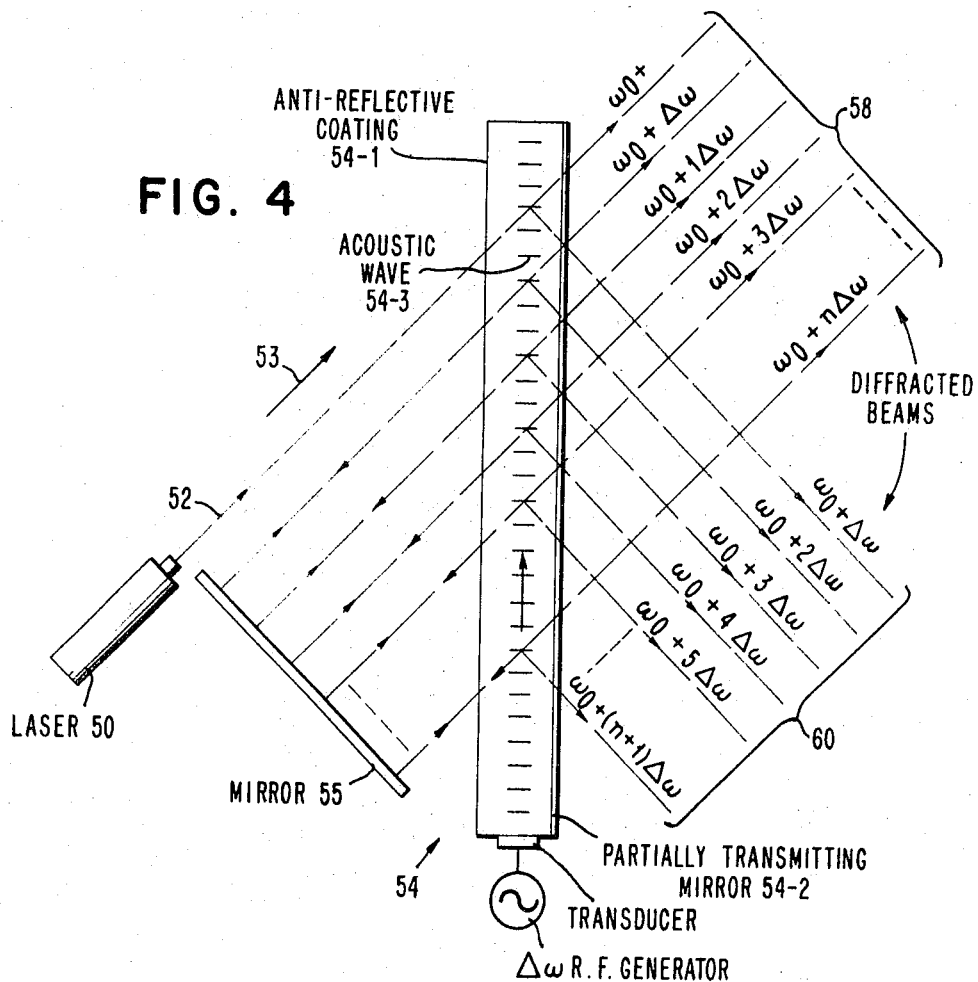
FIG. 4 is a schematic diagram of another embodiment of this invention illustrating the derivation of a plurality of coherent optical beams with particular phase differentials therebetween derived from a single laser beam by appropriate diffractions, reflections and transmissions of related optical energy.

Another embodiment of this invention will now be presented with reference to FIG. 4 wherein a single longitudinal and transverse mode laser 50 provides laser beam 52 to antireflective coating 54-1 of acoustic wave modulator 54. A partially transmitting mirror layer 54-2 is established on the opposite face of the acoustic modulator 54. As each beam in the direction 53 is diffracted by the acoustic wave 54-3, it is partially transmitted and partially diffracted, and the diffracted beam is partially transmitted and partially reflected by partially transmitting mirror 54-2. The consequence of the totality of the diffractions, transmissions and reflections in the embodiment of FIG. 4 is the two sequences of optical beams 58 and 60 with the appropriate frequency differential between each pair of beams thereof to obtain moving light spots on the target trace as described hereinbefore with reference to FIG. 2.

Figure 5:
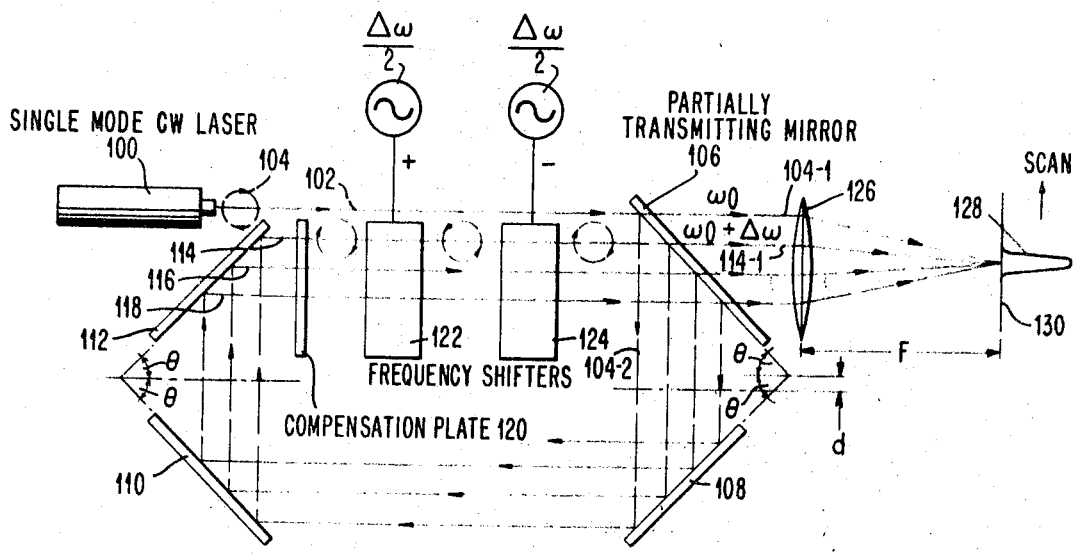
FIG. 5 is a schematic diagram of another embodiment of this invention illustrating the derivation of the requisite plurality of optical beams with particular phase differentials therebetween from offset mirror pairs together with appropriate frequency shifters in the path of the optical energy.

Another embodiment of this invention is presented in FIG. 5 which illustrates a scanning beam provided by a single mode continuous wave laser which develops a stepped frequency array by repetitive reflections from a special mirror configuration. A single longitudinal and transverse mode continuous wave laser 100 provides laser beam 102 which is circularly polarized as shown by the circumferential arrow 104. Partially transmitting mirror 106 transmits beam 104-1 and reflects beam 104-2. The beam 104-2 is successively reflected by mirrors 108, 110, and 112 to provide a second beam 114. The pair of mirrors 106 and 108 is offset axially from the pair of mirrors 110 and 112 vertically by the distance $d$ necessary to offset the beam 102 from the beam 114 by the appropriate geometrical interval, i.e., distance $d$. Each mirror 106, 108, 110 and 112 makes an angle $\theta=45°$ with the beam 102 direction. Intercepting the beams 114, 116 and 118 are frequency shifters 120 and 124 operated at frequency $\Delta\omega/2$, one in a plus direction and one in a minus direction, respectively, so as to retain the direction of polarization for the transmitted beam which emerges as a beam 114 having a frequency $\omega+\Delta\omega$. Also, intercepting the beam paths of the subsequently reflected beams 114, 116, and 118 is a birefringent compensation plate 120 which effectively causes the plane of rotation to be the same for the beams 102, 114, 116 and 118. The lens 126 causes the several beams with the several spaced frequencies transmitted by the partially transmitting mirror 106 to provide the moving interference spot 128 on the target plane 130.

THEORY AND PRACTICE OF THE INVENTION

A linear optical scan is obtained in the practice of this invention from an array of $n$ coherent light sources which are periodically separated in space and frequency, as shown in FIG. 2. When the beams are focused on a screen 20 with a lens 14, a series of maxima, e.g., L-1,...L-4, are obtained which move linearly across the screen on the target trace. The scan rate is given by $r_l=F\lambda\Delta f/d$, where F is the focal length of the lens, $\lambda$ is the mean wavelength of the light, $\Delta f$ is the frequency difference between beams ($\Delta f<<f_o=c/\lambda$) and $d$ is the beam spacing. The scanning rate is increased by increasing $\Delta f$. For example, with $\lambda=6\times10^{-5}$ cm., $\Delta f=10^9$ c.p.s., $d=10^{-2}$ cm. and $F=15$ cm., a rate of $r_l=10^8$ cm./sec. is obtained. The number of resolvable light spots on the focal plane of the collimating lens based on $\Delta x$ of the noted Rayleigh criterion is equal to the number of beams $n$. The number of maxima or lobes of the interference pattern is determined by the size of the aperture A of the light sources, while the spacing of the maxima is determined by $d$. A background reference on the theory of optical interference is the book by M. Born et al., "Principles of Optics," Pergamon Press, 1959.

The wave amplitude in an angular direction $p$ at time $t$ resulting from the array of coherent beams of FIG. 2 is given by the following formula derived for the practice of this invention $$U_{(p,t)} = U^\circ_{(p)} \sum_{n=0}^{N-1} e^{-ik_o dpn} \frac{1}{\sqrt{2\pi}} \int_{-\infty}^{\infty} \delta(\omega - n\Delta\omega) e^{i\omega t} d\omega \quad (1)$$

assuming Fraunhofer diffraction from infinitely long slits. In this equation, $\omega$ is the angular frequency, $\Delta\omega$ is the frequency difference between sources, $k_o$ is the average wave number of the light, and $U^\circ_{(p)}$ is the angular distribution from each source. The spatial phase factor $e^{ik\ dpn}$ is assumed to be the same for all sources since $\Delta\omega << \omega_o = ck_o$. This is consistent with the approximations for Fraunhofer diffraction made by Born et al. in the above-noted reference. When the integration and summation are carried out in equation (1), the amplitude becomes $$U_{(p,t)} = \frac{1}{\sqrt{2\pi}} U^\circ_{(p)} \frac{1 - e^{iN(\Delta\omega t - k_o dp)}}{1 - e^{i(\Delta\omega t - k_o dp)}} \quad (2)$$

where $N$ is the total number of optical beam sources. The resultant intensity is $$I_{(p,t)} = I^\circ_{(p)} \left[ \frac{\sin \frac{1}{2} N(\Delta\omega t - k_o dp)}{\sin \frac{1}{2}(\Delta\omega t - k_o dp)} \right]^2 \quad (3)$$

At $p=0$ (FIG. 2) an intensity maximum on axis 21 is obtained which varies like with the period $T=1/\Delta\omega$, i.e., a train of pulses is emitted similar to the pulses 1B-6 from phase-locked operation of a single frequency array of coherent beams of the prior art. At points off of the axis 21, the timing of the pulses changes linearly as $p$ increases. Thus a linear scan of the interference maximum on the target trace 20 (FIG. 2) is achieved, with the noted linear scanning rate of $r_t = F\Delta\omega/k_o d = F\lambda_o \Delta f/d$.

FIG. 3 presents an embodiment of this invention which uses a multimode laser with an aperture plate 44 to form a spatial array of coherent beams and a linear variation in cavity length, e.g., by the wedge 33 in the cavity. To obtain a fixed phase relationship for the array of beams, an acoustic wave modulator 36 operated at frequency $\Delta\omega$ is used to phase lock the transverse laser modes.

In greater detail, in order to induce phase locking of two modes having different directions and frequencies, e.g., in the embodiment of this invention illustrated in FIG. 3, a sideband produced by the modulator from the first mode must coincide in direction and frequency with the second mode. This is attained by using the acoustic diffraction modulator 36 of FIG. 3, and adjusting the angle between the modes to be $\Delta\Phi = mk_{ac}/k_o$, where $m$ is an integer and $k_{ac}$ and $k_o$ are the acoustic and optical wave vectors, respectively. The diffraction maxima from one mode, which are frequency shifted by the acoustic frequency, coincide with the directions of other modes. When the diffracted intensity is sufficiently great, the phase of the diffracted sidebands of the first mode to lase, e.g., $f_{1s}$ and $f_{2s}$ of FIG. 1D determines the phase of subsequently lasing modes.

For purposes other than the scanning described here, the presence of the longitudinal modes may be desirable. If lasing occurs on a number of longitudinal modes for each of the beams 34-1 to 34-N, the longitudinal waves may be simultaneously phase locked by the modulator 36, provided that they have the same frequency separation $\Delta\omega$ as the beams (i.e., traverse modes) 34-1 to 34-n.

The embodiment of this invention illustrated in FIG. 4 uses a conventional single mode laser 50, and an acoustic diffraction frequency shifter and beam splitter 54. Two stepped frequency optical beam arrays 58 and 60 are formed by multiple diffraction at the Bragg angle by the acoustic wave 54-3. A background reference concerning diffraction of an optical beam from an acoustic wave is an article by E. I. Gordon, Proc. IEEE, 54, 1391 (1966). Further, an acoustic standing wave may be used in the embodiment of FIG. 4 to increase the diffraction efficiency. Each beam has two frequency components $\omega_o \pm n\Delta\omega$. This gives rise to two sets of maxima travelling in opposite directions on the screen.

The stepped-frequency optical beam array for the embodiment of this invention presented in FIG. 5 is obtained by the multiple passing of a laser beam through frequency shifters 122 and 124. Each frequency shifter is driven by an appropriate electric field and operates only on circularly polarized light. Therefore, laser beam 102 is circularly polarized. A background reference concerning frequency shifters is an article by C. F. Buhrer et al., Appl. Phys. Letters, 1, 46 (1962). The shift in frequency is accompanied by a change in the rotation of the circularly polarized light. In order to shift the frequency of the beam successively in the same direction, two frequency shifters 122 and 124 are used, each with a shift of $\Delta\omega/2$, and with the circularly polarized drive fields rotating in opposite directions. After passing through the crystals of the frequency shifters 122 and 124, the frequency shift is $\Delta\omega$ and the transmitted light is circularly polarized in the original direction. Optical phase shifts occurring at the 45° reflectors 106, 108, 110 and 112 is compensated with a suitably oriented birefringent plate 120. When such phase shifts are not compensated, the reflectors change the polarization of the beam from circular to elliptical. Further, in order to equalize the intensities of the output beams for an operational circumstance, the transmission of the output mirror 106 may be graded across the output beams 104-1, 114-1, etc.

A conventional modulator frequency shifter 122 and 124, is used for scanning in the embodiment of FIG. 5. Each modulator is driven at the half-wave voltage $V_{\lambda/2}$. In the prior art electro-optic prism scanner, a voltage of $nV_{\lambda/2}$ is required, where $n$ is the number of resolvable interference spots. A background reference on the prior art electro-optic prism scanner is an article by V. J. Fowler et al., Proc. IEEE, 52 193, (1964).

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical scanner for forming a trace in a surface which is the focal plane of a lens system comprising:
    means for providing a plurality of coherent optical beams in a planar array;
    means for spatially ordering said array to have equal angles and equal distances geometrically between adjacent beams;
    means for forming a composite wave front from said beams and for overlapping them at said surface on said trace; and
    means for temporally ordering said array to have fixed phase and equal frequency differentials in both magnitude and algebraic sign between adjacent beams on said composite wave front so that an interference pattern scans said trace at a rate proportional to said frequency differential.

2. An optical scanner for forming a topological trace in a surface which is the focal plane of a lens system comprising:
    means for providing a plurality of coherent optical beams in a planar array which is spatially ordered to have equal angles and equal distances geometrically between adjacent beams,
    said coherent optical beams being established by a laser cavity, and
    said beams in said array being temporally ordered by an acoustic wave phase locking modulator in said laser cavity to have predetermined phase and equal frequency differentials in both magnitude and algebraic sign between adjacent beams; and
    means for forming a composite wave front from said beams and overlapping them at said surface so that an interference pattern scans said topological trace at a rate proportional to said frequency differential.

3. An optical scanner for forming a topological trace as set forth in claim 2
wherein said laser cavity includes a longitudinal mode selecting optical reflector means.

4. An optical scanner for forming a topological trace as set forth in claim 2
wherein said phase locking modulator is a means for establishing a varying index of refraction in the paths of said coherent optical beams for modulating the frequencies of said beams in accordance with said predetermined phase and frequency differentials.

5. An optical scanner as set forth in claim 4 wherein said means for establishing said varying index of refraction in the paths of said coherent optical beams includes:
a Debye-Sears acoustic wave diffractor means modulated at a given frequency;
a longitudinal mode selecting termination for causing each said optical beam to have only one longitudinal mode;
lens means for focusing said optical beams on said acoustic wave diffractor; and
a step tuning means for offsetting the frequencies of said coherent beams.

6. An optical scanner as set forth in claim 5 wherein
said diffractor means accomplishes said mode locking of said optical beams by diffracting part of each said beam by the angle between adjacent beams and by shifting the frequencies of said diffracted beams by the frequency differential of said adjacent beams, and
said means for establishing said moving interference pattern includes a focusing lens means.

7. An optical scanner as set forth in claim 2 wherein said modulator is for phase locking a plurality of transverse laser modes in a lasing pattern having different directions and frequencies and comprises:
an acoustic diffraction modulator receptive of said laser modes having a given frequency; and
means for adjusting the angle between said laser modes to be equal to the angle between the intensity diffracted maxima from said acoustic modulator for causing the diffraction maxima from one mode which are frequency shifted by said given frequency to coincide with the directions and frequencies of adjacent modes, respectively, and the phase of the diffracted sidebands of the first mode to lase determining the phase of successively lasing modes.

8. An optical scanner for forming a topological trace as set forth in claim 2 wherein said acoustic wave phase locking modulator comprises means to lock the transverse modes in said laser cavity.

9. An optical scanner for forming a topological trace in a surface which is the focal plane of a lens system comprising:
means for providing a plurality of coherent optical beams having predetermined frequency, phase and geometric relationships with each other, said means for providing said plurality of coherent optical beams including
a laser means for providing a single longitudinal and transverse mode laser beam,
an acoustic wave modulator receptive of said laser beam and operable at a given frequency to defract an incident beam, and
a partially transmitting mirror on the side of said acoustic wave modulator opposite said laser means for reflecting a portion of said diffracted incident beam back to said acoustic wave modulator to be diffracted again,
a totally reflecting mirror on the same side of said acoustic wave modulator as said laser means for reflecting the part of said portion of said diffracted incident beam which is transmitted through said acoustic wave modulator back to said modulator,
said laser means, acoustic wave modulator and mirrors cooperating to form a planar array of coherent optical beams which are spatially ordered to have equal angles and equal distances geometrically between adjacent beams and which are temporally ordered to have fixed phase and equal frequency differentials in both magnitude and algebraic sign between adjacent beams, and
means for forming a composite wave front from said beams and for overlapping them at said surface so that an interference pattern scans said topological trace at a rate proportional to said frequency differential.

10. An optical scanner as set forth in claim 9 wherein
said acoustic wave modulator has an antireflective coating on a surface thereof facing a mirror of said configuration disposed at an angle thereto; and
said means for establishing said moving interference pattern includes a focusing lens means receptive of said plurality of coherent optical beams transmitted by said partially transmitting mirror.

11. An optical scanner for forming a topological trace comprising:
means for providing a planar array of a plurality of coherent optical beams having predetermined frequency, phase and geometric relationships with each other, said means for providing said plurality of coherent optical beams including
a single mode continuous wave laser means for providing a single longitudinal and transverse mode laser beam, and
a configuration of a plurality of mirror surfaces, one of said mirror surfaces being partially transmitting,
said partially transmitting mirror surface being receptive of said laser beam, partially transmitting it as one of said plurality of optical beams, and partially reflecting it to provide said others of said plurality of coherent optical beams, and
said other mirror surfaces providing from said reflected optical beam said others of said plurality of coherent optical beams via said partially transmitting mirror so that said array is formed as a spatially ordered output of beams having equal angles and equal distances geometrically between adjacent beams; and
a frequency shifter means within the path of said others of said coherent optical beams to provide said array as a temporally ordered output having a fixed phase and equal frequency differentials in both magnitude and algebraic sign between adjacent beams; and
means for forming a composite wave front from said beams and overlapping them at said surface so that an interference pattern scans said topological trace at a rate proportional to said frequency differential.

12. An optical scanner as set forth in claim 11 wherein said mirror configuration includes a birefringent plate to compensate for any changes in polarization caused by said mirror configuration.

13. An optical scanner as set forth in claim 12 wherein said mirror configuration includes two pairs of mirrors, said one pair being displaced from said other pair by a geometric interval to establish said spatially ordered relationship of said optical beams with each other.

14. Method of optically scanning a topological trace in the focal plane of a lens system with a moving interference spot comprising the steps of:
establishing a plurality of coherent optical beams in a planar array ordered both spatially and temporally, said array being spatially ordered to have equal angles and equal distances geometrically between adjacent beams; and
forming a composite wave front from said beams and overlapping them at the focal plane of said lens system,
said array being temporally ordered to have equal phase differentials and equal frequency differentials in both magnitude and algebraic sign between adjacent beams so that said interference spot scans said topological trace at a rate proportional to said frequency differential.

* * * * *